Sept. 27, 1932. J. V. McCABE 1,879,941
INDICATOR ATTACHMENT FOR CALIPERS OR THE LIKE
Filed Sept. 5, 1928
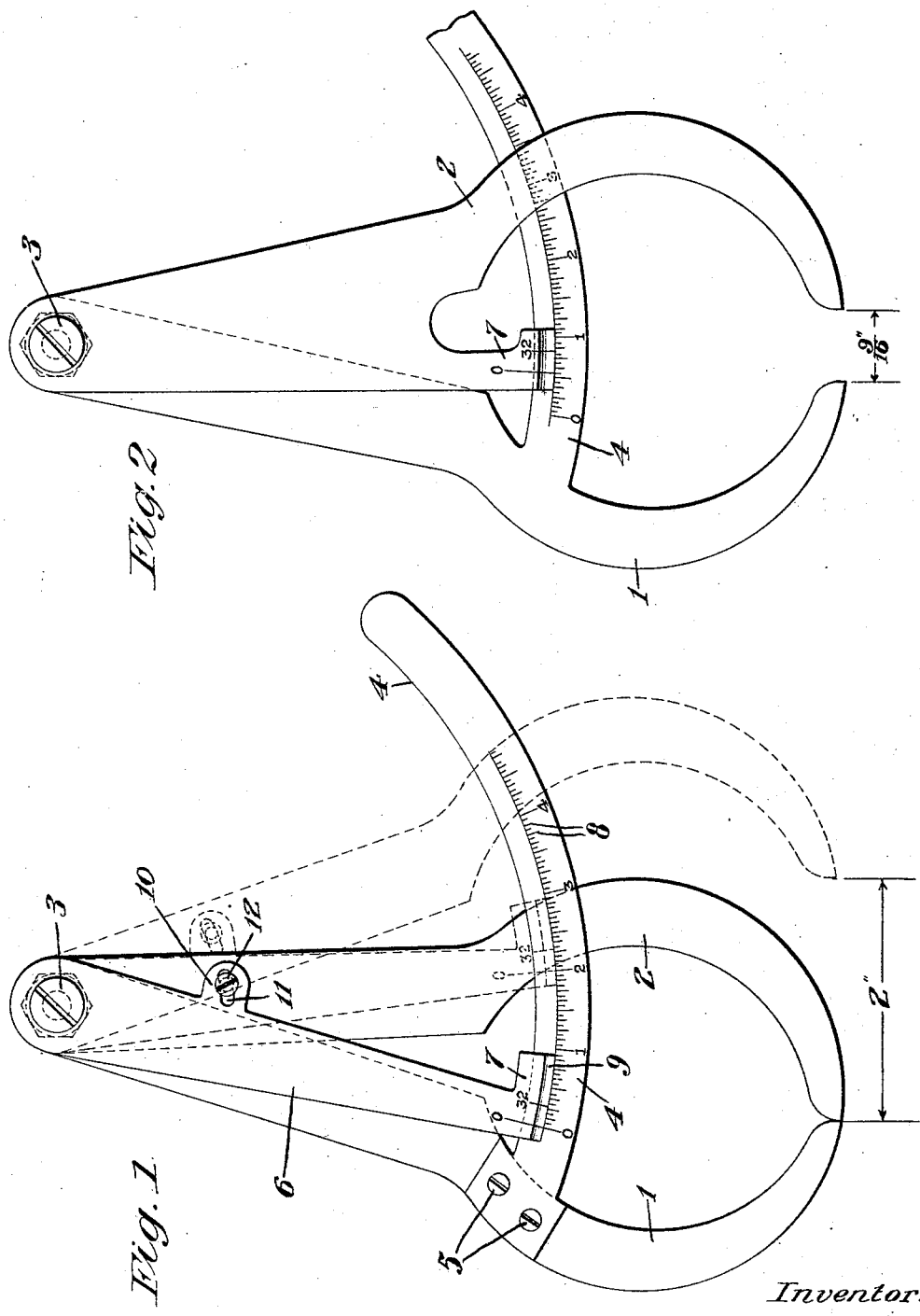
Inventor:
James V. McCabe
By Ellis Spear Jr,
Attorney Patented Sept. 27, 1932

1,879,941

UNITED STATES PATENT OFFICE

JAMES V. McCABE, OF BOSTON, MASSACHUSETTS

INDICATOR ATTACHMENT FOR CALIPERS OR THE LIKE

Application filed September 5, 1928. Serial No. 304,039.

This invention relates to distance measuring instruments and is particularly useful when applied to such an instrument as a calipers or dividers. For the purpose of this application, I have shown my invention as applied to a pair of outside calipers although it will be understood that this treatment is purely illustrative and in no way limiting and that the principles of my invention may be applied to any distance measuring instrument of the type wherein the distance measured is represented by the separation of a pair of pivoted legs.

In instruments of this class as usually constructed it is necessary to place a scale between the points of the legs in order to obtain a reading as to the distance separating such points. Various attachments have been devised for avoiding the use of a separate measuring scale to obtain this reading. Usually such attachments have involved the use of an arcuate scale bar carried by one of the legs of the instrument, this bar being readable with reference either to one of the edges of the opposite instrument leg or to a second graduated scale bar mounted upon said opposite leg.

After repeated use the points of a calipers or dividers show wear and unless this wear is compensated for in any attachment which is intended to indicate visually the degree of separation of the points an inaccurate reading is had.

My present invention not only involves certain structural improvements upon and refinements over prior art attachments but provides for adjusting the indicator attachment itself to compensate for wear at the measuring points of the instrument.

Additionally my attachment is so designed as to insure accurate reading of the indicator at a glance.

In the accompanying drawing:—

Fig. 1 is a face view of my attachment as applied to an outside calipers, the calipers being shown closed in full lines and open in dotted lines and the attachment visually indicating the degree of separation of the calipers points.

Fig. 2 is a view similar to Fig. 1 but showing a modification.

Referring first to Fig. 1, I have indicated at 1 and 2 respectively the legs of an outside calipers of standard type and at 3 the pivot for such legs.

My attachment as shown in this figure comprises in combination with an arcuate scale bar 4 riveted or otherwise secured as at 5 to one of the calipers legs, here shown as the leg 1, a cooperating indicator 6 depending from the same pivot 3 which pivots the legs 1 and 2 to each other so as automatically to open and close with such legs in their opening and closing movements.

The free end of the leg 6 is provided with an arcual measuring end or foot 7. The foot 7 overlaps the upper edge of the arcuate bar 4 and immediately beneath the arc of traverse of said foot on said bar, the bar is graduated as indicated at 8 in any desired scale, here shown as sixteenths of an inch. The outer face of the foot 7 is preferably beveled as indicated at 9 for convenience in reading the measurements and this face carries two spaced reading lines, the line marked "32" and reading in thirty-seconds of an inch, and the line marked "zero" and disposed in advance of said thirty-seconds line.

When the calipers points are closed as indicated in full lines in Fig. 1 the zero line of the measuring foot 7 registers with the zero indication on the scale 8 of the graduated bar 4. When the calipers is open as indicated in dotted lines in Fig. 1, the foot 7 traverses the graduations of the scale bar 8. If the zero line of the foot is exactly registered with one of the eighths or sixteenths graduations of the scale bar 8 the thirty-second line, as a result of its location with respect to the zero line, comes halfway between two adjacent sixteenths graduations beyond the eighths graduation with which the zero line is registered indicated thirty-seconds of an inch. In such case, the thirty-seconds indication will be ignored in computing the final reading of the indicator attachment. If however, the zero line happens to fall midway between any pair of adjacent sixteenths graduations, the thirty-second line will be exactly in register with an adjacent sixteenths graduation and will indicate that the reading is one-thirty-second plus or minus the reading indicated by the zero line. As shown in Fig. 1 the reading registered by the indicator is two inches.

In order to compensate for wear of the calipers points, the leg 6 is adjustably secured to the leg 2 as shown in Fig. 1. For this purpose the leg 6 may conveniently be formed with a lateral extension 10 having an elongated slot 11 therein within which is mounted a set screw 12 disposed through the leg 2. By loosening the set screw and adjusting the leg 6 through the adjustment thus permitted by the slot 11, the device may be compensated for wear at the calipers points.

In the modification of my invention shown in Fig. 2 the measuring foot 7 is shown as an integral extension of the leg 2 disposed substantially in the line of the pivot 3 and the arcuate bar 4 is shown as being integrally formed with the leg 1 and being traversed by the foot 7 as the legs of the instrument are opened. As in Fig. 1 the arrangement of zero and the thirty-second lines is the same. In the form shown in Fig. 2, the reading registered by the indicator is nine-sixteenths of an inch.

Various other modifications in the construction and operation of my device may obviously be resorted to if within the spirit and scope of my invention without departing from the limits of the appended claims.

What I therefore claim and desire to secure by Letters Patent is:

1. A pair of calipers comprising a pair of legs pivoted to each other at one end, a scale bar carried by one of said legs and extending inwardly thereof and overlapping the other leg, a pointer pivoted at one end to the leg pivot and extending inwardly between said legs and having at its other end a measuring foot overlying said scale, said pointer being adjustably secured to the leg not carrying the scale bar and slidable over said scale as said legs are moved on their pivot with relation to each other, and means adjustably securing said pointer with reference to the leg to which it is secured whereby to compensate for wear of the calipers points.

2. A pair of calipers comprising a pair of legs pivoted to each other at one end, a scale bar carried by one of said legs and extending inwardly thereof and overlapping the other leg, a pointer pivoted at one end to the leg pivot and extending inwardly between said legs and having at its other end a measuring foot overlying said scale, said pointer having intermediate its ends a lateral extension provided with an elongated slot overlying the leg not carrying the scale bar, and means passing through said slot for adjustably securing said extension to said leg, whereby the same is movable therewith so as to slide over said scale bar as said legs are moved on their pivot with relation to each other.

In testimony whereof I affix my signature.

JAMES V. McCABE.